United States Patent
Sugawara et al.

(10) Patent No.: US 12,227,174 B2
(45) Date of Patent: Feb. 18, 2025

(54) VEHICLE TRAVELING CONTROL APPARATUS

(71) Applicant: SUBARU CORPORATION, Tokyo (JP)

(72) Inventors: Hideki Sugawara, Tokyo (JP); Takahiro Furuya, Tokyo (JP); Anfen Ye, Tokyo (JP); Kazuki Yamaguchi, Tokyo (JP); Wataru Matsudate, Tokyo (JP); Hayato Hori, Tokyo (JP); Takayuki Sato, Tokyo (JP); Ryo Nakagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 240 days.

(21) Appl. No.: 18/149,266

(22) Filed: Jan. 3, 2023

(65) Prior Publication Data
US 2023/0227029 A1  Jul. 20, 2023

(30) Foreign Application Priority Data

Jan. 20, 2022 (JP) .................................. 2022-007411
Dec. 15, 2022 (JP) .................................. 2022-200352

(51) Int. Cl.
*B60W 30/09* (2012.01)
*B60W 30/095* (2012.01)

(52) U.S. Cl.
CPC .......... *B60W 30/09* (2013.01); *B60W 30/095* (2013.01); *B60W 2510/18* (2013.01); *B60W 2554/4049* (2020.02)

(58) Field of Classification Search
CPC .............. B60W 30/09; B60W 30/095; B60W 2510/18; B60W 2554/4049; B60W 2420/408; B60W 2556/20; B60W 2720/106

See application file for complete search history.

(56) References Cited

U.S. PATENT DOCUMENTS

2024/0317267 A1 * 9/2024 Bergquist ............... G06V 20/58

FOREIGN PATENT DOCUMENTS

JP    2019-057197 A    4/2019

* cited by examiner

*Primary Examiner* — Michael V Kerrigan
(74) *Attorney, Agent, or Firm* — Rimon P.C.

(57) ABSTRACT

A vehicle traveling control apparatus includes a sensor and a traveling control processor configured to function as an identification unit and a tentative identification calculation unit. The identification unit identifies whether the target detected by the sensor is a ghost or a real object based on results of the detection for first number of measurement cycles, and if the target is the real object and a possibility that the target and the vehicle come into contact with each other is present, causes a first traveling control to be executed. The tentative identification calculation unit determines whether the target is the ghost or the real object based on results of the detection for second number of measurement cycles, and when the target is the ghost and the possibility is present, causes a second traveling control to be executed. The second number is less than the first number.

15 Claims, 6 Drawing Sheets

VEHICLE TRAVELING CONTROL APPARATUS

CROSS-REFERENCE TO RELATED APPLICATIONS

The present application claims priority from Japanese Patent Application No. 2022-007411 filed on Jan. 20, 2022, and Japanese Patent Application No. 2022-200352 filed on Dec. 15, 2022, the entire contents of each which are hereby incorporated by reference.

BACKGROUND

The disclosure relates to a vehicle traveling control apparatus.

A sensor is often used as an apparatus to detect a target and measure a positional relationship between an own vehicle and the target. Examples of such a target may include: a moving object (a dynamic target) that is present in front of the own vehicle; a fixed object (a static target) that is present in front of the own vehicle; and a vehicle (a dynamic target) that approaches the own vehicle from the rear of the own vehicle. Such a sensor generally encompasses devices including ultrasonic radars, millimeter-wave radars, and light detection and rangings (LiDARs). Such a sensor radiates a signal wave toward the target and receives a reflected signal wave thereof. The signal wave generally encompasses sonic waves, electric waves, and electromagnetic waves. On the basis of the received reflected signal wave, the sensor measures, for example, a distance from the own vehicle to the target, a relative speed, and a moving direction with respect to the own vehicle from an arriving time and a direction of the reflected signal wave. The measured positional information regarding the target is used as surrounding-region monitoring information upon execution of a control such as a vehicle control or a lane change assist (LCA) control. Examples of the vehicle control may include an adaptive cruise control (ACC) and an autonomous emergency braking (AEB) control.

Other than the reflected signal wave directly received by the sensor, the reflected signal wave from the target may include a secondary reflected signal wave, i.e., a multipath signal wave, that is reflected by a three-dimensional object around the own vehicle serving as a reflection surface and received by the sensor. Examples of the three-dimensional object around the own vehicle may include a wall, a guardrail, and a utility pole. There is an issue that, in a case where the sensor receives the multipath signal wave, a ghost (a virtual image) that actually does not exist may be erroneously determined as the target. Such a ghost may be detected in a direction passing through the wall that has reflected the signal wave immediately before the signal wave is incident on the sensor.

To address this, various techniques have been proposed to distinguish between a real object and a ghost and delete the ghost. For example, Japanese Unexamined Patent Application Publication (JP-A) No. 2019-057197 discloses the following technique. That is, on the basis of a reflected signal wave received by a sensor, even if a moving object is located in front of a traveling path of an own vehicle from a relative relationship between the moving object and the own vehicle, in a case where a traveling direction of the moving object is different from that of the own vehicle, the moving object is recognized as a ghost and is deleted from a road map.

SUMMARY

An aspect of the disclosure provides a vehicle traveling control apparatus to be applied to a vehicle. The vehicle traveling control apparatus includes a sensor and a traveling control processor. The sensor is configured to radiate a signal wave from the vehicle toward a surrounding region of the vehicle, receive a reflected signal wave of the radiated signal wave, and thereby perform detection of a target in the surrounding region of the vehicle at every measurement cycle. The traveling control processor is configured to control traveling of the vehicle when a possibility that the target detected by the sensor and the vehicle come into contact with each other is determined as being present. The traveling control processor configured to function as an identification unit and a tentative identification calculation unit. The identification unit is configured to identify whether the target detected by the sensor is a ghost or a real object based on results of the detection for a first number of measurement cycles, and when the target is identified as the real object and the possibility that the target and the vehicle come into contact with each other is determined as being present, cause a first traveling control to be executed. The first number is two or greater. The tentative identification calculation unit is configured to determine whether the target detected by the sensor is the ghost or the real object based on results of the detection for a second number of measurement cycles, and when the target is determined as the ghost and the possibility that the target and the vehicle come into contact with each other is determined as being present, cause a second traveling control to be executed. The second number is less than the first number. The second traveling control is different from the first traveling control.

An aspect of the disclosure provides a vehicle traveling control apparatus to be applied to a vehicle. The vehicle traveling control apparatus includes a sensor and a traveling control processor. The sensor is configured to radiate a signal wave from the vehicle toward a surrounding region of the vehicle, receive a reflected signal wave of the radiated signal wave, and thereby perform detection of a target in the surrounding region of the vehicle at every measurement cycle. The traveling control processor is configured to control traveling of the vehicle when a possibility that the target detected by the sensor and the vehicle come into contact with each other is determined as being present. The traveling control processor configured to function as an identification unit and a tentative identification calculation unit. The identification unit is configured to identify whether the target detected by the sensor is a ghost or a real object based on results of the detection for a first number of measurement cycles, and when the target is identified as the real object and the possibility that the target and the vehicle come into contact with each other is determined as being present, cause a first traveling control to be executed. The first number is two or greater. The tentative identification calculation unit is configured to determine whether the target detected by the sensor is the ghost or the real object based on results of the detection for a second number of measurement cycles, and when the target is unable to be determined as the ghost or the real object and the possibility that the target and the vehicle come into contact with each other is determined as being present, cause a third traveling control to be executed. The second number is less than the first number. The third traveling control is different from the first traveling control.

BRIEF DESCRIPTION OF THE DRAWINGS

The accompanying drawings are included to provide a further understanding of the disclosure, and are incorporated

DETAILED DESCRIPTION

According to a technique disclosed in JP-A No. 2019-057197, a ghost is deleted from a road map. This prevents unnecessary execution of a vehicle control which is to be executed on the basis of a detection result obtained by a sensor. Accordingly, it is possible to reduce an uncomfortable feeling given to an occupant including a driver.

However, it is sometimes difficult to determine whether a target such as a moving object is a real object or a ghost. A traveling control apparatus may detect the target on the basis of a signal wave transmitted from and received by the sensor at every measurement cycle. In a case where it is difficult to determine whether the target is the real object or the ghost, the traveling control apparatus may accumulate measurement results for several tens of cycles and thereby determine whether the target is the real object or the ghost.

A determination method used in such a case may be as follows. For example, first, a detection rate of the target may be calculated with respect to the number of measurement cycles. In a case where the calculated detection rate is smaller than a predetermined threshold, the target may be determined as the ghost. In a case where the calculated detection rate is greater than the threshold, the target may be determined as the real object.

Thus, the traveling control apparatus may suspend the vehicle control until the measurement results for several tens of cycles are accumulated to determine whether the target is the real object or the ghost. Accordingly, in a case where the target is determined as the real object, due to a delay in detection, it may be difficult to secure sufficient time to notify an occupant in advance of execution of a brake control upon executing the brake control. This may confuse the occupant including the driver upon execution of a contact avoidance operation based on a control such as an AEB control or a steering control.

In a case where the target is the real object, the occupant including the driver has already visually recognized the target. Accordingly, a delay in execution of a control by the traveling control apparatus can make the occupant uncomfortable.

It is desirable to provide a vehicle traveling control apparatus that is able to reduce an uncomfortable feeling given to an occupant.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. For convenience, the following description is given referring to an example of a road where drivers are to keep to the left. Accordingly, for a road where drivers are to keep to the right, left and right settings or the like may be appropriately set in an opposite manner.

Figure 1:
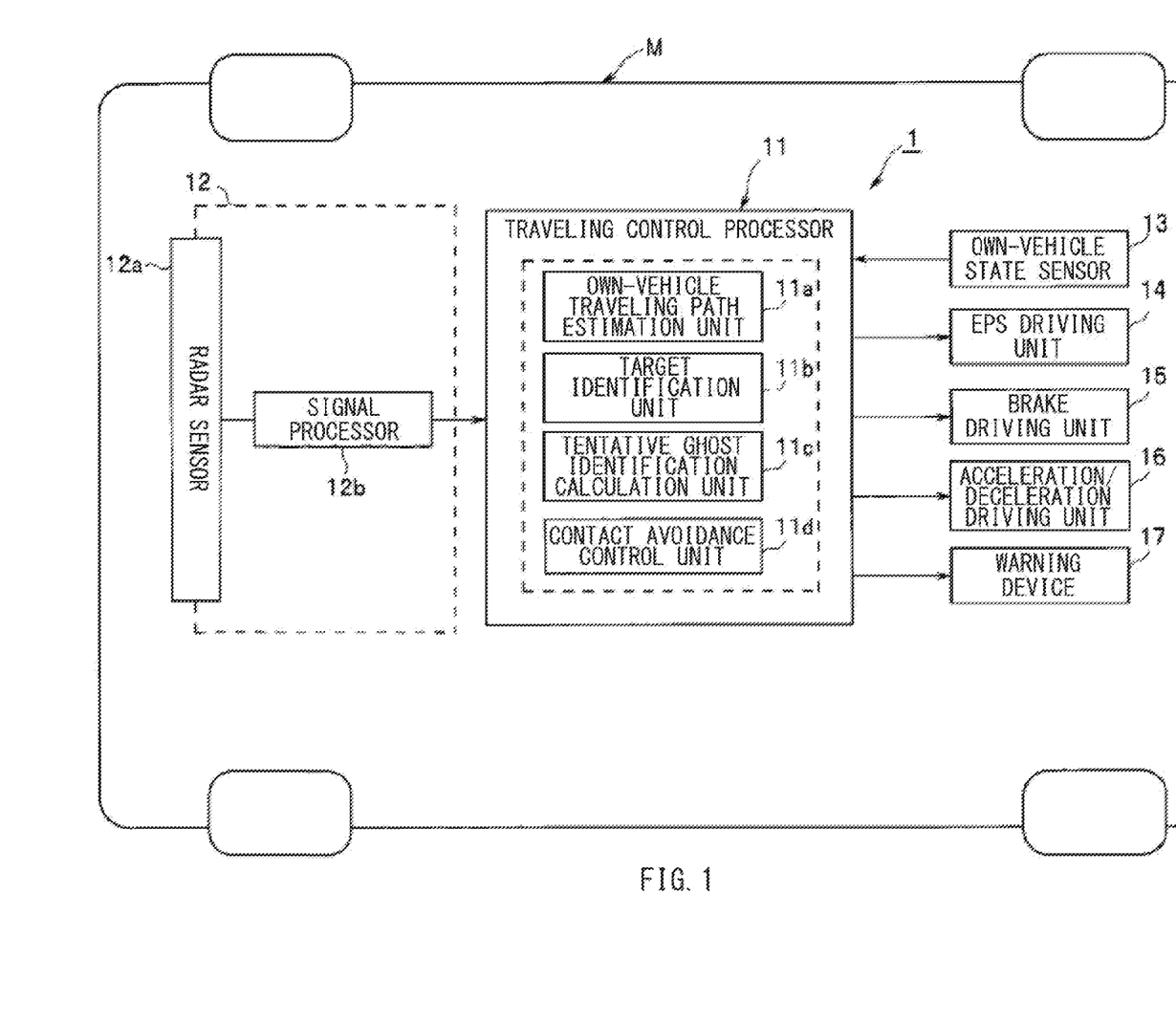
FIG. 1 is a diagram schematically illustrating a configuration of a traveling control apparatus.

As illustrated in FIG. 1, a traveling control apparatus 1 to be mounted on an own vehicle M includes a traveling control processor 11. Coupled to an input side of the traveling control processor 11 may be a surrounding environment information acquisition unit 12 and an own-vehicle state sensor 13. In one embodiment, the traveling control apparatus 1 may serve as a "vehicle traveling control apparatus".

The traveling control processor 11 may include a microcontroller that includes a central processing unit (CPU), a random-access memory (RAM), a read-only memory (ROM), a rewritable non-volatile memory, and peripheral devices. Examples of the rewritable non-volatile memory may include a flash memory and an electrically erasable and programmable read-only memory (EEPROM). The ROM may hold, for example, fixed data and a program to be used in execution of each process by the CPU. The RAM may be provided as a work area of the CPU and may tentatively hold various pieces of data to be used by the CPU. Note that the CPU may also be referred to as a microprocessor (MPU) or a processor. In one example, a graphics processing unit (GPU) or a graph streaming processor (GSP) may be used in place of the CPU. In another example, any of the CPU, the GPU, and the GSP may be selected and used in combination.

The surrounding environment information acquisition unit 12 may include a radar sensor 12a and a signal processor 12b. In one embodiment, the radar sensor 12a may serve as a "sensor". The radar sensor 12a may generally encompass an ultrasonic radar, a millimeter-wave radar, and a LiDAR. One or more radar sensors 12a may be so provided as to perform sensing of a front region, a front-side region, a rear-side region, and a rear region of the own vehicle M. The radar sensor 12a may perform sensing of an environment surrounding the own vehicle M at every measurement cycle and thereby acquire surrounding environment information. The signal processor 12b may perform signal processing on the surrounding environment information acquired by the radar sensor 12a, and supply the processed surrounding environment information to the traveling control processor 11. The surrounding environment information may include information regarding a dynamic target and a three-dimensional static target. Examples of the dynamic target may include a vehicle that is present around the own vehicle M, i.e., a surrounding vehicle, and a pedestrian. Examples of the vehicle that is present around the own vehicle M may include an automobile, a motorcycle, and a bicycle. Example of the three-dimensional static target may include a wall, a guardrail, a utility pole, and a signboard. Note that although the example embodiment is described referring to the radar sensor, any device that radiates a signal wave may be used. For example, a device that is able to recognize a position of an object around the own vehicle M, such as a sonar, may be used.

The own-vehicle state sensor 13 may generally encompass a sensor group that detects various states regarding the own vehicle M. The own-vehicle state sensor 13 may include, for example, a vehicle-speed sensor, a steering angle sensor, and a yaw rate sensor. The vehicle-speed sensor may detect a vehicle speed of the own vehicle M, i.e., an own vehicle speed. The steering angle sensor may detect a steering angle of the own vehicle M. The yaw rate sensor may detect a yaw rate acting on the own vehicle M.

Coupled to the output side of the traveling control processor 11 may be an EPS driving unit 14, a brake driving unit 15, an acceleration/deceleration driving unit 16, and a warning device 17. The EPS driving unit 14 may drive an electric power steering (EPS) and execute steering of the own vehicle M. The brake driving unit 15 may decelerate the own vehicle M by forcible braking. The acceleration/deceleration driving unit 16 may adjust an output of a driving source, such as an engine or an electric motor, mounted on the own vehicle M, and adjust a gear ratio of a transmission mounted on the own vehicle M. The warning device 17 may audibly or visually notify an occupant such as a driver of appropriate information.

The traveling control processor 11 may include an own-vehicle traveling path estimation unit 11a, a target identification unit 11b, a tentative ghost identification calculation unit 11c, and a contact avoidance control unit 11d to execute an operation of avoiding contact between a target T, which will be described later, and the own vehicle M. In one embodiment, the target identification unit 11b may serve as an "identification unit". In one embodiment, the tentative ghost identification calculation unit 11c may serve as a "tentative identification calculation unit".

The own-vehicle traveling path estimation unit 11a may set a traveling path (an own-vehicle traveling path) for allowing the own vehicle M to travel along a traveling route to a destination set by an unillustrated car navigation system. Alternatively, the own-vehicle traveling path estimation unit 11a may estimate a traveling path (an own-vehicle traveling path) on which the own vehicle M is to travel on the basis of road map information stored in the car navigation system and a steering angle detected by the steering angle sensor included in the own-vehicle state sensor 13.

The target identification unit 11b may detect a distance to the target T present around the own vehicle M and a position of the target T on the basis of the surrounding environment information acquired by the radar sensor 12a of the surrounding environment information acquisition unit 12. The target T may be the dynamic target or the static target. In addition, the target identification unit 11b may identify whether the detected target T is a ghost Tg or a real object Tr. The reflected signal wave, which encompasses a sonic wave, an electric wave, and an electromagnetic wave, may include a multipath signal wave other than a signal wave that is reflected by the target T and directly received by the radar sensor 12a. The multipath signal wave may be the reflected signal wave from the target T that is reflected by a three-dimensional object, such as a wall, a guardrail, or a utility pole, as a reflection surface and received by the radar sensor 12a.

FIGS. 3 to 6 each illustrate an example of a situation in which the target identification unit 11b may erroneously recognize, as the target T, the ghost Tg detected on the basis of the surrounding environment information obtained from the surrounding environment information acquisition unit 12. Note that for simple description, FIGS. 3 to 6 each illustrate only the reflected signal wave.

Figure 3:
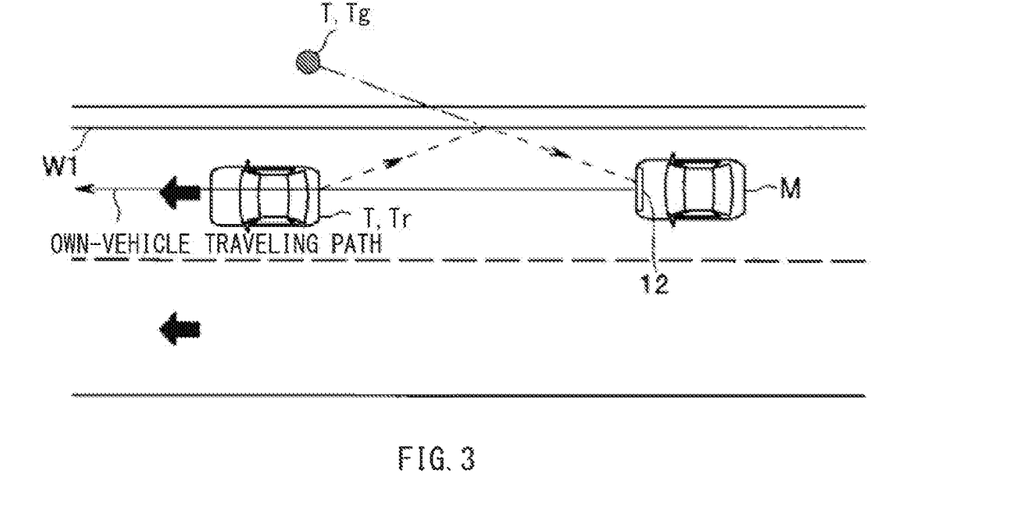
FIG. 3 is a bird's-eye view of a situation in which a target is detected on the transmission side of a side wall.

FIG. 3 illustrates a situation in which the ghost Tg is detected by a reflected signal wave from a preceding vehicle. That is, a reflected signal wave from the target T (the preceding vehicle) that is a real object Tr traveling immediately in front of the own vehicle M is reflected by a wall W1 and thereafter received by the radar sensor 12a. As a result, due to such a reflected signal wave, the radar sensor 12a may detect, on an opposing lane road, the target T that is a ghost Tg which does not actually exist.

Figure 4:
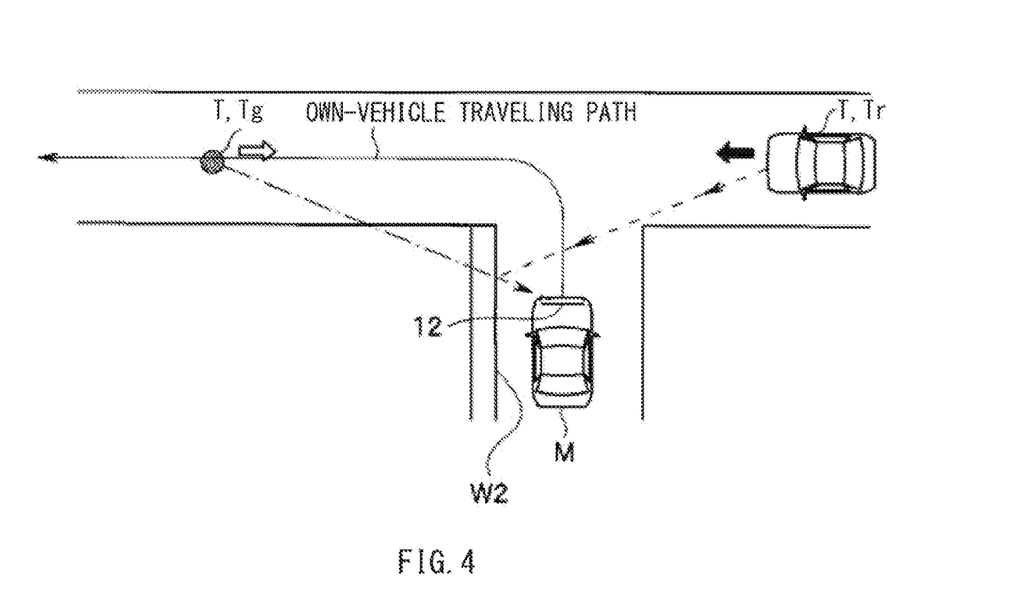
FIG. 4 is a bird's-eye view of a situation in which the target is detected on an own-vehicle traveling path in a case where an own vehicle is to enter a priority road from a T-intersection.

FIG. 4 illustrates a situation in which the ghost Tg is detected by a reflected signal wave from a vehicle that is traveling on a priority road when the own vehicle M is to enter the priority road from a T-intersection. That is, a reflected signal wave from the target T (the vehicle) that is a real object Tr approaching the own vehicle M is reflected by a wall W2 and thereafter received by the radar sensor 12a when the own vehicle M is to turn left and enter the priority road from the T-intersection. As a result, the radar sensor 12a may detect the target T that is a ghost Tg present in the traveling direction of the own vehicle M, i.e., on the own-vehicle traveling path.

Figure 5:
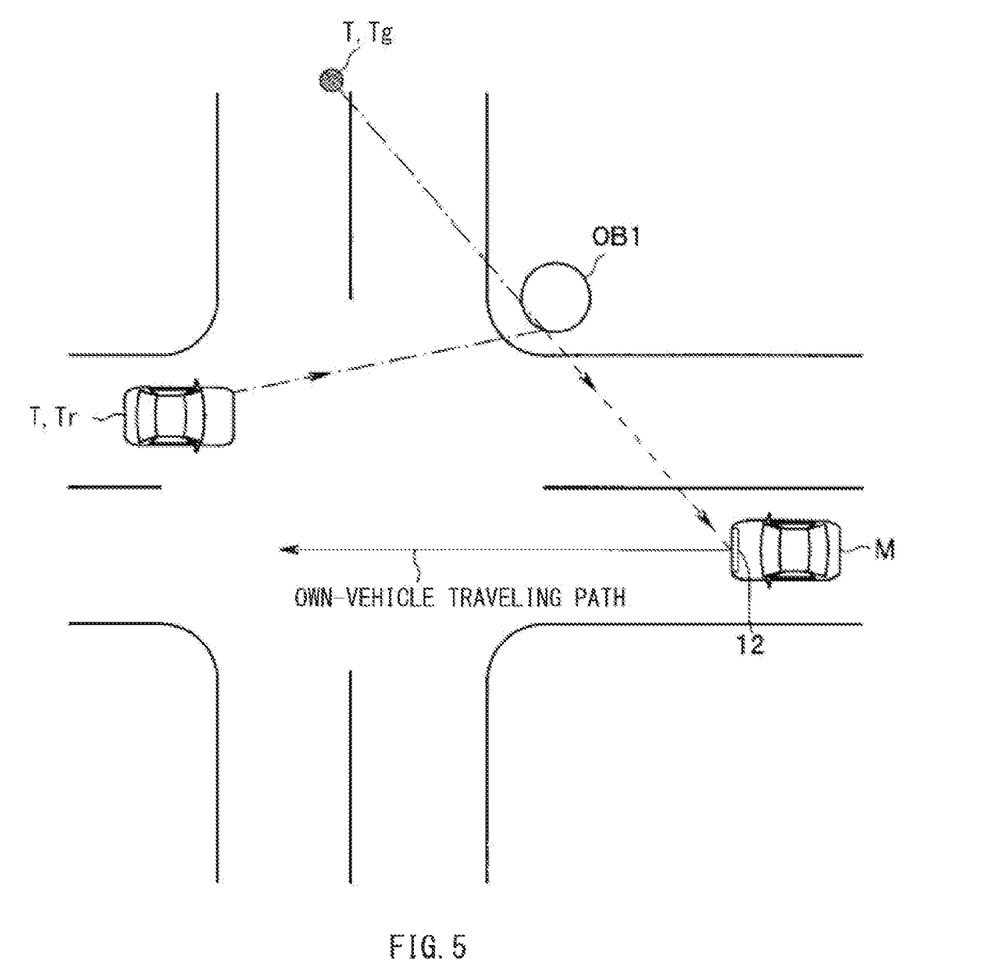
FIG. 5 is a bird's-eye view of a situation in which the target is detected on a road intersecting with a road on which the own vehicle is traveling.

FIG. 5 illustrates a situation in which the ghost Tg is detected by a reflected signal wave from an oncoming vehicle when the own vehicle M is to enter an intersection. That is, a reflected signal wave from the target T (the oncoming vehicle) that is a real object Tr traveling on an opposing lane is reflected by a static target OB1 such as a utility pole and thereafter received by the radar sensor 12a when the own vehicle M is to enter the intersection. As a result, the radar sensor 12a may detect the target T that is a ghost Tg present in a direction of a lane intersecting with a lane on which the own vehicle M is traveling.

Figure 6:
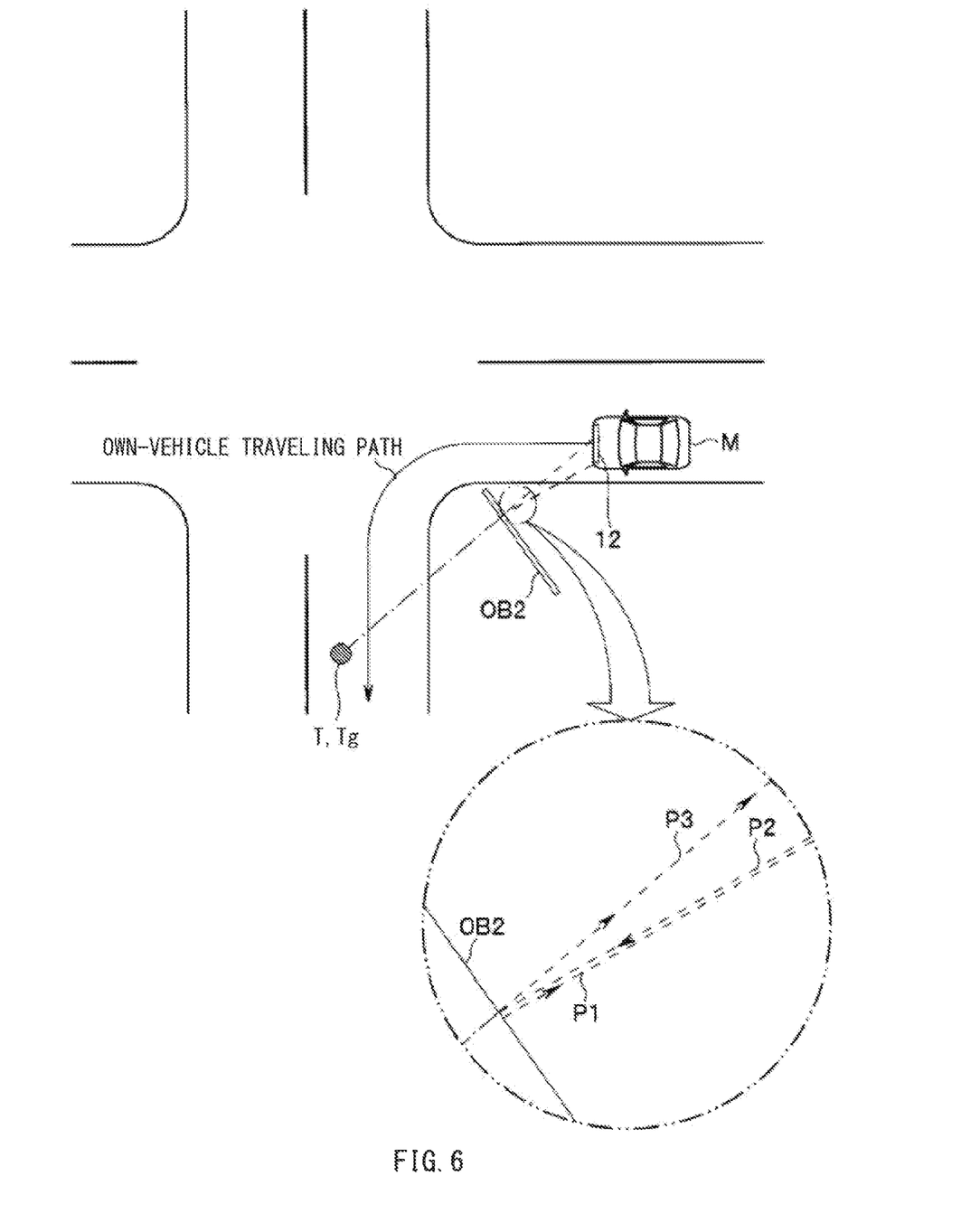
FIG. 6 is a bird's-eye view of a situation in which the target is detected in a direction in which the own vehicle is to turn left and travel.

FIG. 6 illustrates a situation in which a signal wave radiated from the radar sensor 12a is applied to a static target OB2 and the ghost Tg is detected by a reflected signal wave from the static target OB2 when the own vehicle M is to turn left at an intersection. The static target OB2 may be, for example, a guide board standing on a roadside. That is, in a case where the own vehicle M that is to turn left at the intersection is traveling on the left side before the intersection, the signal wave radiated from the radar sensor 12a is sometimes applied to the static target OB2 standing on the roadside, a reflected signal wave P1 from the static target OB2 is reflected by the own vehicle M, a reflected signal wave P2 from the own vehicle M is then reflected by the static target OB2, and a reflected signal wave P3 from the static target OB2 is received by the radar sensor 12a. As a result, the target identification unit 11b may detect the target T that is a ghost Tg on the own-vehicle traveling path set in the direction to turn left on the basis of the surrounding environment information obtained from the radar sensor 12a, as if the signal wave has passed through the static target OB2.

The target identification unit 11b may accumulate detection results regarding the target T for several tens of measurement cycles, and determine a detection rate of the target T with respect to the number of the measurement cycles.

That is, in a case where the target T is the ghost Tg, the target T may be detected if a certain condition is satisfied. Therefore, the detection rate may be low. In contrast, in a case where the target T is the real object Tr, the target T may be detected almost constantly. Thus, if the detection rate is lower than a preset threshold, the target identification unit 11b may determine that the target T is the ghost Tg. If the detection rate is higher than the threshold, the target identification unit 11b may determine that the target T is the real object Tr. In one example, whether the target T is the real object Tr or the ghost Tg may be determined on the basis of the number of times of detection of the target T out of a predetermined number of the measurement cycles, instead of the detection rate.

In a case where the target T is identified as the real object Tr, the target identification unit 11b may determine whether a possibility that the target T and the own vehicle M come into contact with each other is present. In a case where the possibility that the target T and the own vehicle M come into contact with each other is determined as being present, the target identification unit 11b may cause the warning device 17 to operate and cause the contact avoidance control unit 11d to execute a first traveling control. The first traveling control may be a control of avoiding contact by causing the EPS driving unit 14 and the brake driving unit 15 to operate. In contrast, in a case where the target T is identified as the ghost Tg, the target identification unit 11b may erase the ghost Tg from target information. Note that in one example, whether the target T is the real object Tr or the ghost Tg may be determined for the target T in a case where the possibility that the target T and the own vehicle M come into contact with each other is present.

While the target identification unit 11b is identifying whether the target T is the ghost Tg or the real object Tr, the tentative ghost identification calculation unit 11c may examine whether the possibility that the target T and the own vehicle M come into contact with each other is present. If the possibility of such contact is determined as being present, the tentative ghost identification calculation unit 11c may tentatively examine whether the target T is to be identified as the ghost Tg or is the real object Tr.

In addition, in a case where the target identification unit 11b or the tentative ghost identification calculation unit 11c determines that the target T is the real object Tr and where the target identification unit 11b or the tentative ghost identification calculation unit 11c determines that the possibility that the target T and the own vehicle M come into contact with each other is present, the contact avoidance control unit 11d may forcefully cause a unit such as the EPS driving unit 14 or the brake driving unit 15 to operate and thereby perform a control of avoiding contact with the real object Tr which is the target T.

The target identification unit 11b described above may accumulate the measurement results for several tens of cycles obtained by the radar sensor 12a and thereby identify whether the target T is the ghost Tg or the real object Tr. The tentative ghost identification calculation unit 11c may determine whether the target T is to be tentatively identified as the ghost on the basis of the measurement results for the number of cycles that is less than the number of cycles used in the identification performed by the target identification unit 11b. For example, the tentative ghost identification calculation unit 11c may accumulate detection results obtained by the target identification unit 11b for several cycles and thereby determine whether the target T is to be tentatively identified as the ghost Tg, whether the target T is the real object Tr, or whether it is difficult to determine whether the target T is to be tentatively identified as the ghost Tg or is the real object Tr. For example, the tentative ghost identification calculation unit 11c may accumulate detection results for about ten cycles. The tentative ghost identification calculation unit 11c may cause the contact avoidance control unit 11d to execute a second traveling control on the basis of a result of such a determination. The second traveling control may be a control to perform various kinds of contact avoidance. For example, the second traveling control may be different from the above-described first traveling control. In the second traveling control, if the target T is determined as being to be tentatively identified as the ghost Tg, a tentative identification control may be executed. The tentative identification control may be a control of causing the brake to gradually operate and thereby causing the own vehicle M to approach the target T which is the ghost Tg. The control of causing the own vehicle M to approach the target T may be performed, for example, on the basis of well-known time to collision (TTC). The TTC may be calculated on the basis of the distance from the own vehicle M to the target T and a relative speed at every calculation period. The calculation may be performed by the following: TTC=(distance from own vehicle to target)/relative speed.

This may prevent the vehicle control from being suspended while the target identification unit 11b is identifying whether the target T is the ghost Tg. In addition, in a case where the tentative ghost identification calculation unit 11c identifies the target T as the ghost Tg, the own vehicle M may be decelerated gradually. Accordingly, even in a case where the target identification unit 11b thereafter determines that the target T is the real object Tr, it is possible to cause contact avoidance to be executed while securing sufficient time for the execution, for example, by a steering control performed by the EPS driving unit 14 or a brake control performed by the brake driving unit 15.

Figure 2A:
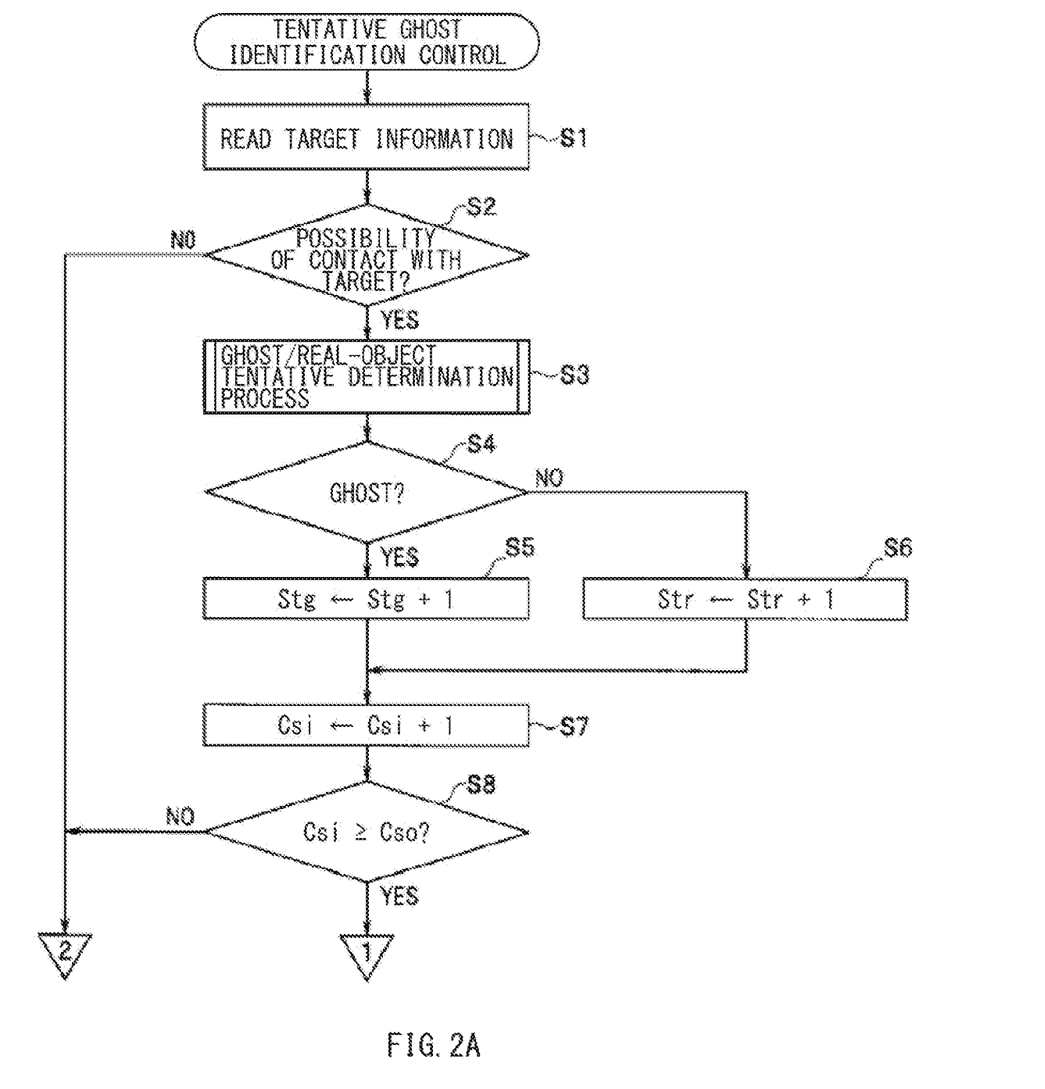
FIG. 2A is a flowchart illustrating a tentative ghost identification control routine.
Figure 2B:
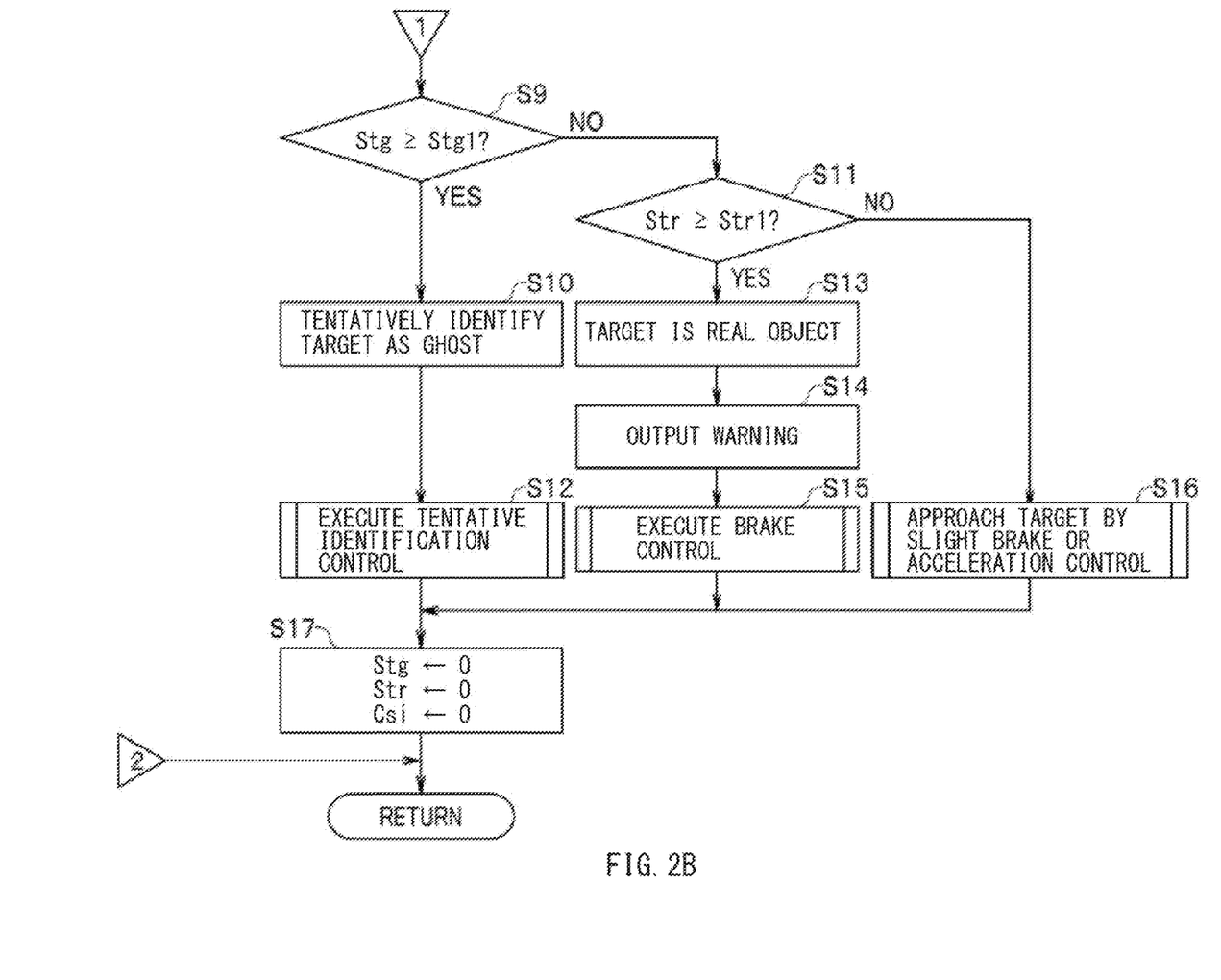
FIG. 2B is another flowchart illustrating the tentative ghost identification control routine.

FIGS. 2A and 2B illustrate a tentative ghost identification control routine to be executed by the traveling control processor 11. Processes in steps S12, S15, and S16 of the tentative ghost identification control routine may be executed by the contact avoidance control unit 11d, and processes in steps other than the steps S12, S15, and S16 may be executed by the tentative ghost identification calculation unit 11c. A ghost determination in the tentative ghost identification control routine may be performed at every predetermined number Cso of measurement cycles. The number Cso of measurement cycles may be set to be less than the number of cycles of ghost identification executed by the target identification unit 11b. For example, the number of cycles of ghost identification executed by the target identification unit 11b may be several tens of cycles; the number Cso of measurement cycles may be several cycles. Thus, it is possible to execute the vehicle control at an early timing before the number of measurement cycles reaches the number that allows the target identification unit 11b to identify the target T as the ghost Tg.

After a system is started, the tentative ghost identification control routine may be executed at every predetermine calculation period. First, in step S1, the tentative ghost identification calculation unit 11c may read information regarding the target T from the target identification unit 11b. Thereafter, the process may proceed to step S2, in which the tentative ghost identification calculation unit 11c may examine whether the possibility that the target T and the own vehicle M come into contact with each other is present on the basis of the read information regarding the target T. For example, the tentative ghost identification calculation unit 11c may examine whether the possibility that the target T and the own vehicle M come into contact with each other is present as follows. The tentative ghost identification calculation unit $11c$ may determine a location and a time at which the target T reaches a target traveling path on the basis of the own-vehicle traveling path set by the own-vehicle traveling path estimation unit $11a$, a relative distance of the target T, and a detected position of the target T. Thereafter, the tentative ghost identification calculation unit $11c$ may determine a time at which the own vehicle M reaches the location at which the target T reaches the target traveling path. The tentative ghost identification calculation unit $11c$ may compare the time at which the own vehicle M reaches the location with the time at which the target T reaches the location. The tentative ghost identification calculation unit $11c$ may thus examine whether the possibility that the target T and the own vehicle M come into contact with each other is present. If the possibility that the target T and the own vehicle M come into contact with each other is determined as being present (step S2: YES), the process may proceed to step S3. If the possibility that the target T and the own vehicle M come into contact with each other is determined as not being present (step S2: NO), the process may exit the tentative ghost identification control routine.

In step S3, the tentative ghost identification calculation unit $11c$ may execute a process of tentatively determining whether the read target T is the ghost Tg or the real object Tr by a reliability degree process. A reliability degree to be used in the reliability degree process may be, for example, a reliability degree that is calculated on the basis of a relative positional relationship between multiple targets T and the radar sensor $12a$. In this reliability degree process, a reliability degree may be determined as "high" for the target T detected in a place where the target T is assumed to be detected. In contrast, a reliability degree may be determined as "low" for the target T detected in a place where the target T is not assumed to be detected. For example, as illustrated in FIGS. 3 and 4, in a case where a reflected signal wave from the target T that is the real object Tr is reflected by the wall W1 or W2 and received by the radar sensor $12a$, the target T may be detected in a direction passing through the wall W1 or W2. Accordingly, a reliability regarding such a target T may be low, and the target T may be tentatively determined as the ghost Tg.

Thereafter, the process may proceed to step S4, in which the tentative ghost identification calculation unit $11c$ may examine whether the target T has been tentatively determined as the ghost Tg. If the target T has been tentatively determined as the ghost Tg (step S4: YES), the process may proceed to step S5. In step S5, the tentative ghost identification calculation unit $11c$ may perform increment of ghost cycle number Stg (Stg←Stg+1). Thereafter, the process may proceed to step S7. If the target T has been tentatively determined as the real object Tr (step S4: NO), the process may be branched to step S6. In step S6, the tentative ghost identification calculation unit $11c$ may perform increment of real-object cycle number Str (Str←Str+1). Thereafter, the process may proceed to step S7.

In step S7 after step S5 or S6, the tentative ghost identification calculation unit $11c$ may perform increment of a cycle count value Csi (Csi←Csi+1). Thereafter, the process may proceed to step S8. In step S8, the tentative ghost identification calculation unit $11c$ may examine whether the cycle count value Csi has reached a set cycle value Cso. The set cycle value Cso may be, for example, 10 cycles.

If the cycle count value Csi has not reached the set cycle value Cso yet (Csi<Cso, step S8: NO), the process may exit the tentative ghost identification control routine. If the cycle count value Csi has reached the set cycle value Cso (Csi≥Cso, step S8: YES), the process may proceed to step S9.

In step S9, the tentative ghost identification calculation unit $11c$ may compare the ghost cycle number Stg with a ghost determination cycle value Stg1 and thereby examine whether the number of cycles in which the target T is determined as the ghost Tg out of the set cycle value Cso is greater than or equal to the ghost determination cycle value Stg1. The ghost determination cycle value Stg1 may be, for example, three or four cycles. If the ghost cycle number Stg is greater than or equal to the ghost determination cycle value Stg1 (Stg≥Stg1, step S9: YES), the target T may not be determinable as the real object Tr and the process may therefore proceed to step S10. In step S10, the tentative ghost identification calculation unit $11c$ may tentatively identify the target T as the ghost Tg. Thereafter, the process may proceed to step S12. If the ghost cycle number Stg is less than the ghost determination cycle value Stg1 (Stg<Stg1, step S9: NO), the process may be branched to step S11. In step S11, the tentative ghost identification calculation unit $11c$ may compare the real-object cycle number Str with a real-object determination cycle value Str1 and thereby examine whether the number of cycles in which the target T is determined as the real object Tr out of the set cycle value Cso is greater than or equal to the real-object determination cycle value Str1. The real-object determination cycle value Str1 may be, for example, six or seven cycles. If the real-object cycle number Str is greater than or equal to the real-object determination cycle value Str1 (Str≥Str1, step S11: YES), the process may proceed to step S13. If the real-object cycle number Str is less than the real-object determination cycle value Str1 (Str<Str1, step S11: NO), the process may be branched to step S16.

In step S12, the contact avoidance control unit $11d$ may execute the tentative identification control as the second traveling control and the process may proceed to step S17. The tentative identification control may cause, although the target T is not determinable as the real object Tr, a control intervention to be executed at a timing earlier than a timing of the identification performed by the target identification unit $11b$, in other words, without waiting for completion of the identification performed by the target identification unit $11b$. Such a control intervention may be executed on the basis of the distance from the own vehicle M to the target T and the relative speed. The tentative identification control may be a traveling control to cause the own vehicle M to gradually approach the target T. Such a tentative identification control may be performed by an associated control of the brake control performed by the brake driving unit 15 and an acceleration/deceleration control performed by the acceleration/deceleration driving unit 16.

In step S13, the tentative ghost identification calculation unit $11c$ may determine that the target T is the real object Tr. Thereafter, the process may proceed to step S14. In step S14, the tentative ghost identification calculation unit $11c$ may cause the warning device 17 to operate and thereby notify the occupant including the driver that the target T, which is the real object Tr, is present on the own-vehicle traveling path. Thereafter, the process may proceed to step S15. In step S15, the contact avoidance control unit $11d$ may execute a traveling control of adjusting a distance from the own vehicle M to the target T. Such a traveling control may be performed by decelerating the own vehicle M by the brake control performed by the brake driving unit 15. The processes in steps S14 and S15 may be similar to the processes to be executed in a case where the target identification unit 11b identifies the target T as the real object Tr and where the possibility that the target T and the own vehicle M come into contact with each other is present. After execution of the process in step S15, the process may proceed to step S17. In one example, a deceleration rate at which the own vehicle M is decelerated in the traveling control executed in step S15 may be lower than that in the traveling control executed in a case where the target identification unit 11b identifies the target T as the real object Tr and where the possibility that the target T and the own vehicle M come into contact with each other is present.

In step S16 branched from step S11, whether the target T is the ghost Tg or the real object Tr may be undeterminable. Therefore, the traveling control processor 11 may cause the brake driving unit 15 and the acceleration/deceleration driving unit 16 to operate and thereby execute a third traveling control. The third traveling control may be a control of causing the own vehicle M to gradually approach the target T by a slight brake control, the acceleration/deceleration control, or both of a level that allows the own vehicle M to stop before reaching the recognized target T. After execution of the process in step S16, the process may proceed to step S17. By causing the own vehicle M to gradually approach the target T in step S16, even in a case where it is difficult to determine that the target T is the ghost Tg, it is possible to secure time for executing the determination as to whether the target T is the ghost Tg at a subsequent cycle without giving the occupant a strange feeling.

As described above, the traveling control to be executed in each of steps S12, S15, and S16 may be a control of decelerating the own vehicle M by the brake control or the acceleration/deceleration control. The deceleration rate at which the own vehicle M is decelerated in the traveling control may be set to be the highest in the traveling control executed in step S15 and may be set to be the lowest in the traveling control executed in step S12. The deceleration rate at which the own vehicle M is decelerated in the traveling control executed in step S16 may be set to be lower than the deceleration rate at which the own vehicle M is decelerated in the traveling control executed in step S15, and may be set to be higher than the deceleration rate at which the own vehicle M is decelerated in the traveling control executed in step S12.

In step S17 after step S12, S15, or S16, the tentative ghost identification calculation unit 11c may clear each of the ghost cycle number Stg, the real-object cycle number Str, and the cycle count value Csi (Stg, Str, Csi←0). Thereafter, the process may exit the tentative ghost identification control routine. As a result, the traveling control for the own vehicle M may move on to a traveling control corresponding to an identification result obtained by the target identification unit 11b.

In a case where the target identification unit 11b identifies the target T as the ghost Tg while the traveling control is being executed in each of steps S12, S15, and S16, the own vehicle M may not be to be decelerated. Therefore, the traveling control may be ended. In contrast, in a case where the target identification unit 11b identifies the target T as the real object Tr while the traveling control is being executed in step S12 or S16, executed may be the process, including warning and the traveling control, to be executed in a case where the target identification unit 11b identifies the target T as the real object Tr and where the possibility that the target T and the own vehicle M come into contact with each other is present.

As described above, in the example embodiment, the target identification unit 11b may identify whether the target T is the ghost Tg or the real object Tr with high accuracy on the basis of the results of the detection for first number of measurement cycles. The first number may be two or greater. In addition, the tentative ghost identification calculation unit 11c may tentatively determine whether the target T is the ghost Tg or the real object Tr on the basis of the results of the detection for second number of measurement cycles. The second number may be less than the first number. Further, in a case where the tentative ghost identification calculation unit 11c tentatively identifies the target T as the ghost Tg, the tentative identification control may be executed and the own vehicle M may be thereby caused to gradually approach the target T. Accordingly, it is possible to reduce the strange feeling given to the occupant whether the target T is the ghost Tg which the occupant does not recognize or the real object Tr which the occupant has already visually recognized. In addition, even if the target identification unit 11b thereafter determines that the target T is the real object Tr, a sudden brake operation is avoidable, which makes it possible to avoid confusing the occupant.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In one example, in the tentative ghost identification control routine described above, after the target T is tentatively identified as the ghost Tg in step S10, the process may proceed to step S17 without execution of the process in step S12.

In another example, because whether the target T is the ghost Tg or the real object Tr is undeterminable in step S16, the control intervention may be cancelled and the process may exit the tentative ghost identification control routine. Thereafter, the tentative ghost identification control may be newly executed again. In step S2, it may be determined whether the possibility that the target T and the own vehicle M come into contact with each other is present; however, in one example, whether the possibility that the target T and the own vehicle M come into contact with each other is present may be determined for the target T determined as the real object Tr.

According to an example embodiment of the disclosure, a traveling control processor identifies whether a target is a ghost or a real object with high accuracy on the basis of results of detection for first number of measurement cycles. The first number is two or greater. In addition, the traveling control processor tentatively determines whether the target is the ghost or the real object on the basis of results of the detection for second number of measurement cycles and causes a control intervention to be performed at an earlier timing on the basis of a result of the determination. The second number is less than the first number. Accordingly, even in a case where it is difficult to instantly determine whether the target is the real object or the ghost, sudden deceleration is avoidable, which makes it possible to reduce an uncomfortable feeling given to an occupant.

Each of the traveling control processor 11, the own-vehicle traveling path estimation unit 11a, the target identification unit 11b, the tentative ghost identification calculation unit 11c, and the contact avoidance control unit 11d illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the traveling control processor 11, the own-vehicle traveling path estimation unit 11a, the target identification unit 11b, the tentative ghost identification calculation unit 11c, and the contact avoidance control unit 11d illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the traveling control processor 11, the own-vehicle traveling path estimation unit 11a, the target identification unit 11b, the tentative ghost identification calculation unit 11c, and the contact avoidance control unit 11d illustrated in FIG. 2.

The invention claimed is:

1. A vehicle traveling control apparatus to be applied to a vehicle, the vehicle traveling control apparatus comprising:
   a sensor configured to radiate a signal wave from the vehicle toward a surrounding region of the vehicle, receive a reflected signal wave of the radiated signal wave, and thereby perform detection of a target in the surrounding region of the vehicle at every measurement cycle; and
   a traveling control processor configured to control traveling of the vehicle when a possibility that the target detected by the sensor and the vehicle come into contact with each other is determined as being present, wherein
   the traveling control processor configured to function as
      an identification unit configured to identify whether the target detected by the sensor is a ghost or a real object based on results of the detection for a first number of measurement cycles, and when the target is identified as the real object and where the possibility that the target and the vehicle come into contact with each other is determined as being present, cause a first traveling control to be executed, the first number being two or greater, and
      a tentative identification calculation unit configured to determine whether the target detected by the sensor is the ghost or the real object based on results of the detection for a second number of measurement cycles, and when the target is determined as the ghost and the possibility that the target and the vehicle come into contact with each other is determined as being present, cause a second traveling control to be executed, the second number being less than the first number, the second traveling control being different from the first traveling control.

2. The vehicle traveling control apparatus according to claim 1, wherein the traveling control processor is configured to end the second traveling control when the identification unit identifies the target as the ghost while the second traveling control is being executed.

3. The vehicle traveling control apparatus according to claim 2, wherein
   the first traveling control is a control of decelerating the vehicle, and
   the second traveling control is a control of decelerating the vehicle at a deceleration rate that is lower than a deceleration rate at which the vehicle is decelerated in the first traveling control.

4. The vehicle traveling control apparatus according to claim 1, wherein the traveling control processor is configured to execute the first traveling control when the identification unit identifies the target as the real object while the second traveling control is being executed.

5. The vehicle traveling control apparatus according to claim 4, wherein
   the first traveling control is a control of decelerating the vehicle, and
   the second traveling control is a control of decelerating the vehicle at a deceleration rate that is lower than a deceleration rate at which the vehicle is decelerated in the first traveling control.

6. The vehicle traveling control apparatus according to claim 1, wherein the traveling control processor is configured to execute a third traveling control when the tentative identification calculation unit is unable to determine the target as the ghost or the real object and the possibility that the target and the vehicle come into contact with each other is determined as being present, the third traveling control being different from the first traveling control and different from the second traveling control.

7. The vehicle traveling control apparatus according to claim 6, wherein
   the first traveling control is a control of decelerating the vehicle, and
   the second traveling control is a control of decelerating the vehicle at a deceleration rate that is lower than a deceleration rate at which the vehicle is decelerated in the first traveling control.

8. The vehicle traveling control apparatus according to claim 6, wherein the third traveling control is a control of decelerating the vehicle at a deceleration rate that is lower than a deceleration rate at which the vehicle is decelerated in the first traveling control and higher than a deceleration rate at which the vehicle is decelerated in the second traveling control.

9. The vehicle traveling control apparatus according to claim 1, wherein
   the first traveling control is a control of decelerating the vehicle, and
   the second traveling control is a control of decelerating the vehicle at a deceleration rate that is lower than a deceleration rate at which the vehicle is decelerated in the first traveling control.

10. A vehicle traveling control apparatus to be applied to a vehicle, the vehicle traveling control apparatus comprising:
    a sensor configured to radiate a signal wave from the vehicle toward a surrounding region of the vehicle, receive a reflected signal wave of the radiated signal wave, and thereby perform detection of a target in the surrounding region of the vehicle at every measurement cycle; and
    a traveling control processor configured to control traveling of the vehicle when a possibility that the target detected by the sensor and the vehicle come into contact with each other is determined as being present, wherein the traveling control processor configured to function as
- an identification unit configured to identify whether the target detected by the sensor is a ghost or a real object based on results of the detection for a first number of measurement cycles, and when the target is identified as the real object and the possibility that the target and the vehicle come into contact with each other is determined as being present, cause a first traveling control to be executed, the first number being two or greater, and
- a tentative identification calculation unit configured to determine whether the target detected by the sensor is the ghost or the real object based on results of the detection for a second number of measurement cycles, and when the target is unable to be determined as the ghost or the real object and the possibility that the target and the vehicle come into contact with each other is determined as being present, cause a third traveling control to be executed, the second number being less than the first number, the third traveling control being different from the first traveling control.

11. The vehicle traveling control apparatus according to claim 10, wherein the traveling control processor is configured to end the third traveling control when the identification unit identifies the target as the ghost while the third traveling control is being executed.

12. The vehicle traveling control apparatus according to claim 11, wherein
the first traveling control is a control of decelerating the vehicle, and
the third traveling control is a control of decelerating the vehicle at a deceleration rate that is lower than a deceleration rate at which the vehicle is decelerated in the first traveling control.

13. The vehicle traveling control apparatus according to claim 10, wherein the traveling control processor is configured to execute the first traveling control when the identification unit identifies the target as the real object while the third traveling control is being executed.

14. The vehicle traveling control apparatus according to claim 13, wherein
the first traveling control is a control of decelerating the vehicle, and
the third traveling control is a control of decelerating the vehicle at a deceleration rate that is lower than a deceleration rate at which the vehicle is decelerated in the first traveling control.

15. The vehicle traveling control apparatus according to claim 10, wherein
the first traveling control is a control of decelerating the vehicle, and
the third traveling control is a control of decelerating the vehicle at a deceleration rate that is lower than a deceleration rate at which the vehicle is decelerated in the first traveling control.

* * * * *